US009703113B2

(12) United States Patent
Guenter et al.

(10) Patent No.: US 9,703,113 B2
(45) Date of Patent: *Jul. 11, 2017

(54) ANTI-SHAKE CORRECTION SYSTEM FOR CURVED OPTICAL SENSOR

(71) Applicant: Microsoft Technology Licensing, LLC, Redmond, WA (US)

(72) Inventors: Brian K. Guenter, Redmond, WA (US); Neel S. Joshi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,836

(22) Filed: Feb. 25, 2014

(65) Prior Publication Data

US 2014/0301728 A1    Oct. 9, 2014

Related U.S. Application Data

(63) Continuation of application No. 13/829,944, filed on Mar. 14, 2013, now Pat. No. 8,699,868.

(51) Int. Cl.
*G02B 27/64* (2006.01)
*H04N 5/232* (2006.01)
*H04N 5/369* (2011.01)
*G03B 5/08* (2006.01)

(52) U.S. Cl.
CPC .......... *G02B 27/646* (2013.01); *G03B 5/08* (2013.01); *H04N 5/23254* (2013.01); *H04N 5/23258* (2013.01); *H04N 5/23287* (2013.01); *H04N 5/3696* (2013.01); *G03B 2205/0015* (2013.01); *G03B 2205/0069* (2013.01); *G03B 2217/005* (2013.01)

(58) Field of Classification Search
USPC .......................................... 396/55
See application file for complete search history.

(56) References Cited

U.S. PATENT DOCUMENTS

| 3,163,098 A | 12/1964 | Kierstead, Jr. |
| 3,428,812 A | 2/1969 | Burke |
| 4,467,361 A | 8/1984 | Ohno et al. |
| 5,184,521 A | 2/1993 | Tyler |
| 6,028,712 A | 2/2000 | McKenney et al. |

(Continued)

FOREIGN PATENT DOCUMENTS

JP    2007101662 A    4/2007

OTHER PUBLICATIONS

"Shake Reduction Technology", Retrieved at <<http://c758710.r10.cf2.rackcdn.com/files/support/manual/1327548737__All_Bodies_Shake_Reduction_012208.pdf>>, Jan. 22, 2008, 4 pages.

(Continued)

*Primary Examiner* — Clayton E LaBalle
*Assistant Examiner* — Linda B Smith

(57) ABSTRACT

The subject disclosure is directed towards a curved image sensor that is rotated in one or more rotational directions to compensate for camera movement, e.g., camera shake. In one aspect, sensors such as gyroscopes output camera movement data, which a controller uses to rotate the curved (e.g., hemispherical) image sensor about its center of curvature, e.g., via signals to electrical and/or magnetic movement mechanisms. Image processing may be used by the controller to rotate the image sensor.

20 Claims, 9 Drawing Sheets

(56) References Cited

U.S. PATENT DOCUMENTS

| | | | |
|---|---|---|---|
| 6,285,400 B1* | 9/2001 | Hokari | H04N 5/217 250/239 |
| 6,693,666 B1 | 2/2004 | Baker et al. | |
| 6,791,072 B1* | 9/2004 | Prabhu | 250/208.1 |
| 7,208,905 B2 | 4/2007 | Shibatani | |
| 7,397,066 B2* | 7/2008 | Oliver | 257/81 |
| 7,626,621 B2* | 12/2009 | Ito et al. | 348/294 |
| 7,634,178 B2 | 12/2009 | Washisu | |
| 7,907,174 B2 | 3/2011 | Stuckler | |
| 7,973,822 B2* | 7/2011 | Kawai | H02N 2/028 310/323.02 |
| 8,203,612 B2 | 6/2012 | Ito et al. | |
| 8,289,406 B2 | 10/2012 | Brackmann | |
| 2002/0080242 A1* | 6/2002 | Takahashi et al. | 348/208 |
| 2002/0080248 A1 | 6/2002 | Adair et al. | |
| 2008/0106976 A1* | 5/2008 | Davidsen et al. | 367/140 |
| 2008/0204887 A1 | 8/2008 | Kaluzhny | |
| 2008/0260324 A1 | 10/2008 | Takahashi et al. | |
| 2009/0002501 A1 | 1/2009 | Silsby et al. | |
| 2009/0118580 A1 | 5/2009 | Sun et al. | |
| 2010/0165131 A1 | 7/2010 | Makimoto et al. | |
| 2010/0309323 A1* | 12/2010 | Shin et al. | 348/208.4 |
| 2012/0039589 A1 | 2/2012 | Ku et al. | |
| 2012/0242882 A1* | 9/2012 | Sutton et al. | 348/340 |
| 2012/0320161 A1 | 12/2012 | Javidi et al. | |
| 2013/0176401 A1 | 7/2013 | Monari et al. | |
| 2013/0300838 A1 | 11/2013 | Borowski | |
| 2014/0013361 A1 | 1/2014 | Monari et al. | |

OTHER PUBLICATIONS

Bando, et al., "Motion Deblurring from a Single Image Using Circular Sensor Motion", Retrieved at <<http://web.media.mit.edu/~bandy/circular/PG11circular.pdf>>, Computer Graphics Forum, vol. 30, No. 7, 2011, 10 pages.

"Anti-Shake Correction System for Curved Optical Sensor", U.S. Appl. No. 13/829,944, filed Mar. 14, 2013, 31 pages.

"International Search Report and Written Opinion Issued in PCT Patent Application No. PCT/US2014/022870", Mailed Date: Jun. 25, 2014, 11 pages.

"Notice of Allowance in U.S. Appl. No. 13/829,944", Mailed Date: Nov. 4, 2013, 10 pages.

"Corrected Notice of Allowance in U.S. Appl. No. 13/829,944", Mailed Date: Mar. 18, 2014, 2 Pages.

"Second Written Opinion Issued in PCT Patent Application No. PCT/US2014/022870", Mailed Date: Feb. 18, 2015, 8 Pages.

\* cited by examiner

ANTI-SHAKE CORRECTION SYSTEM FOR CURVED OPTICAL SENSOR

BACKGROUND

Cameras shake from being used while moving (e.g., in a vehicle), and also because people cannot hold a camera perfectly steady. Shaking causes blur in images captured with longer exposure times, and other undesirable effects in general.

To compensate for shaking, many cameras have built-in anti-shake (often referred to as image stabilization) systems. Such systems are particularly useful in scenarios such as to correct camera shake from an unsteady hand, or while capturing video in a moving car or boat, where higher frequency vibrations and other relative movements of the camera cannot be otherwise handled. In general, such anti-shake-enabled cameras have a planar imaging surface that is moved horizontally and/or vertically as needed to compensate for the camera's unsteady movements.

However, optical lens systems do not generally have their best focus on a planar imaging surface. For example, spherical lens systems tend to best focus on a roughly hemispherical surface, called the Petzval surface. Much of the complexity of lens design is in forcing the lens system to achieve best focus on a planar imaging surface, far away from the Petzval surface.

Developments in sensor technology have yielded somewhat low resolution curved sensors (with the resolution likely to increase in the future) that provide for improved quality of images. However, with such curved sensors, existing anti-shake systems do not function correctly; indeed, such correction systems would instead make the captured images worse, (e.g., go in and out of focus).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which a camera includes a curved sensor that is configured to be rotated about (or substantially about) a center of curvature of the curved sensor in at least one direction. An anti-shake correction controller receives input data corresponding to camera movement, causes movement of the curved sensor in at least one rotational direction to correct for at least some of the camera movement.

In one aspect, upon receiving movement-related data, rotation amounts and rotation directions are computed based upon the movement related data. A curved sensor is rotated based upon the rotation amounts and rotation directions. The movement-related data may be received as data sensed by a sensor set and/or feedback data obtained by processing image data to determine camera movement.

In one aspect, a camera comprises a curved sensor configured to be rotated relative to a lens, in which the lens has a field of view that is larger than the curved sensor's image capturing region at any one positioning of the sensor. A controller receives movement-related data corresponding to camera movement, and adjusts the positioning of the curved sensor including to rotate the sensor in at least one rotational direction to compensate for the camera movement.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a camera including a curved (e.g., silicon) sensor that is moved for camera shake correction, that is, contains an anti-shake system. This results in more stable image capture, while at the same time benefitting from the significantly improved sharpness across the imaging field (e.g., at any focal length) that results from having a curved (non-planar) sensor.

One of the advantages of a curved sensor system is that it is relatively easy to design lenses that are sharp and have uniform illumination, across a wide field of view. Conventional camera lenses tend to have a significant drop in both sharpness and relative illumination at the corners of the image. If the sensor is not moving this tends to not be a problem because the lowest resolution fields of the lens are at the corners of the image where they are less distracting. However when the sensor moves to correct shake, those lower resolution fields get translated closer to the center of the image and the sharpest focus of the lens is no longer in the center of the image. The same phenomenon occurs for illumination, in that the darker corners get translated closer to the center of the image field.

To correct large angle shake with a conventional lens, if the image sensor is laterally displaced to its extreme limits, the relative illumination, at least, will probably have to corrected. Because it is easier to design wide angle curved sensor lenses, a rotational anti-shake system can likely compensate for much larger angular deviations, corresponding to much rougher and more extreme vibration conditions.

Thus, in one aspect, the sensor is moved to compensate for shaking, in which a hemispherical sensor is rotated about the center of curvature of the sensor in up to three dimensions, (e.g., the θ, φ and/or ψ angular directions. The sensor also may be translated if desired, e.g., in the Z direction.

The movement may be accomplished by sensing camera movement and driving one or more various movement mechanisms to compensate. Also provided is dynamically measuring the effect of movement, e.g., objects in the image that have moved over time, and adjusting the positioning (e.g., rotational angles) of the sensor to maintain the objects' general positions.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and optical sensing in general.

Figure 1:
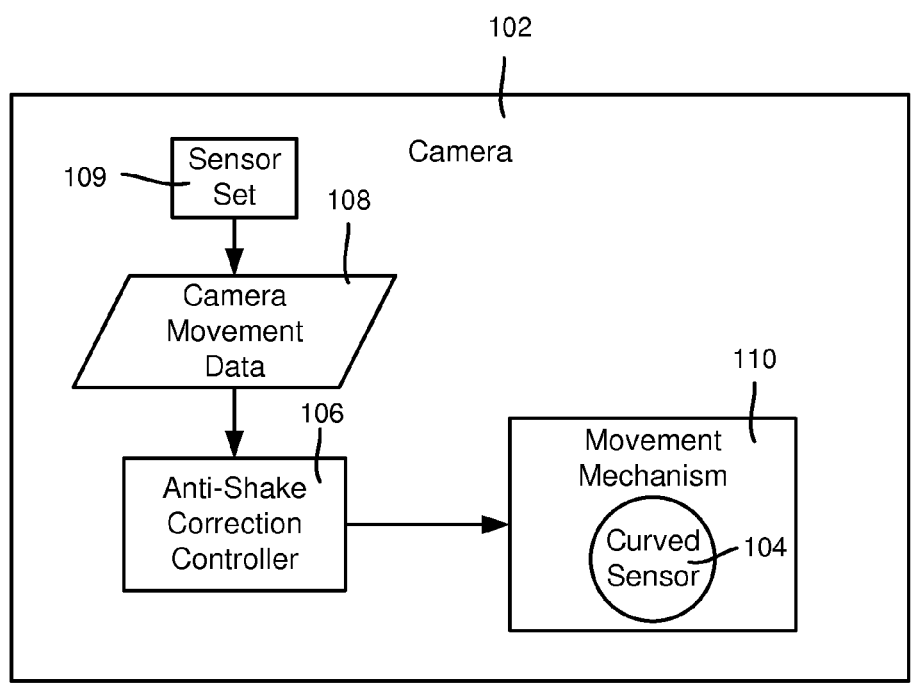
FIG. 1 is a block diagram showing example components configured for rotating a curved sensor based upon sensed camera movement data, according to one or more example embodiments.

As generally represented in FIG. 1, an exemplified camera 102 includes a curved sensor 104. In some embodiments, the curved sensor 104 is designed to be hemispherical (and if not perfectly hemispherical is substantially hemispherical with respect to acceptably capturing images), but in any event, is non-planar. An anti-shake correction controller 106 dynamically controls the rotational angles of the curved sensor 104 based upon camera movement data 108, such as by controllably driving a movement mechanism 110 via a suitable driving signal, including through any intermediaries such as an amplifier, digital to analog converter, and/or the like. For example, a sensor set 109 comprising one or more sensors such as gyroscopes (and possibly others such as accelerometers) may provide highly-sensitive movement data. In this embodiment, the sensed movement data 108 is used as input to drive the mechanism 110 to counteract the camera's movement.

Figure 2:
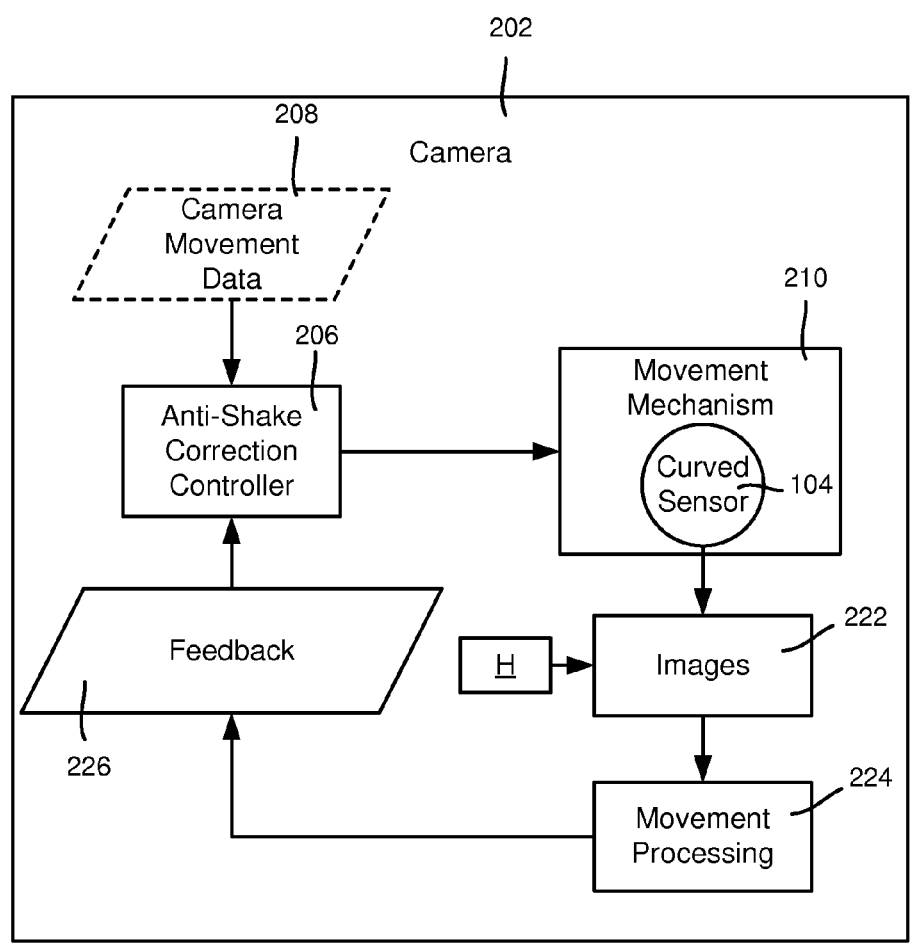
FIG. 2 is a block diagram showing example components configured for rotating a curved sensor based at least in part upon image processing feedback, according to one or more example embodiments.

As represented in FIG. 2, (in which components similar to those of FIG. 1 are labeled 2xx instead of 1xx), the input to the anti-shake correction controller 206 need not be (at least not solely) a measure of actual camera movement data 208, but rather may include the movement's effect on the position of one or more objects in the image. For example, objects that are not moving in the images 222 relative to one another quickly can be detected by movement processing 224. This can be provided as feedback 226 to the anti-shake correction controller 206. Note that the curved sensor 104 may be used to provide the images that are processed for movement using some (e.g., predictive) processing techniques, but instead a very high-frame rate sensor H may capture evaluation images that are processed for movement detection so that the curved sensor may be adjusted many times during relatively slow-frame rate image capture. Note that the sensed camera movement data 208 may be used in conjunction with movement processing 224/feedback 226.

Figure 3:
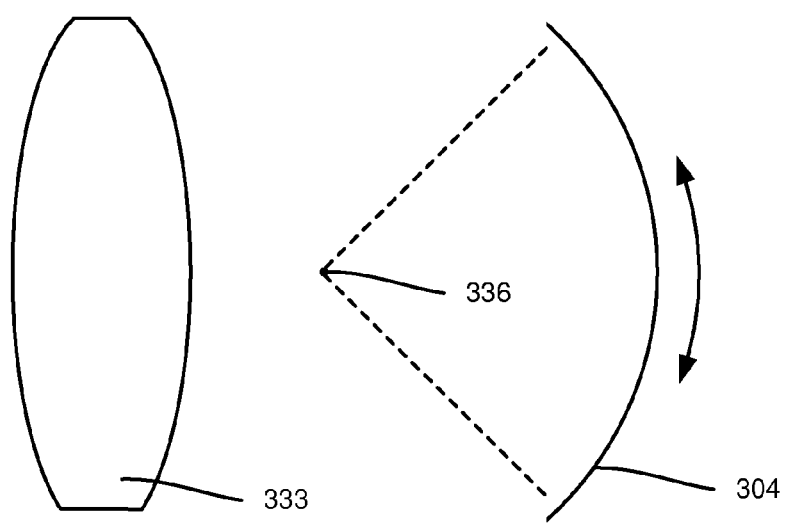
FIG. 3 is a representation of rotating a curved sensor (in one rotational direction) relative to a lens, according to one or more example embodiments.

FIG. 3 is a two-dimensional view showing how a curved sensor 304 may be rotated in one direction to a different angle as a lens 333 (fixed to a camera) moves relative to the curved sensor as the camera shakes. The lens 333 may be designed to cover an additional five to ten degree field of view (relative to the curved sensor's image capturing region at any one positioning of the sensor), whereby the system can compensate for a relatively very large amount of shake.

As is seen in FIG. 3, the rotation is about the center of the curvature 336 of the curved sensor 304. Note that this center of the curvature 336 is the same point for a hemispherical sensor rotated in other rotational directions, however for a curved sensor that is not hemispherical, different centers of curvature may exist. Further, some amount of translational movement may be used to adjust for a sensor that is not quite hemispherical.

Figure 4A:
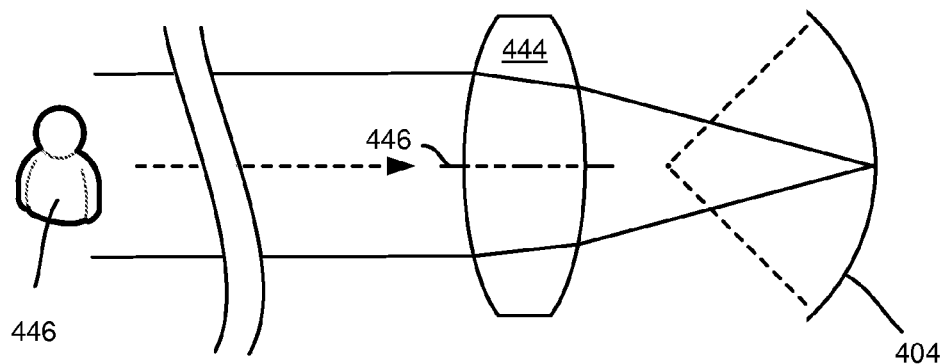
FIGS. 4A and 4B are representations of rotating a curved sensor (in one rotational direction) relative to a lens over time to adjust for camera movement, according to one or more example embodiments.
Figure 4B:
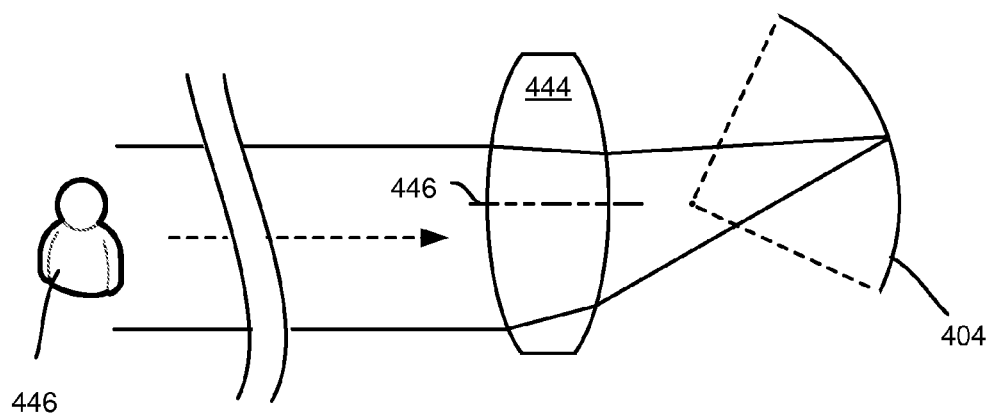

FIGS. 4A and 4B show the general concept of how rotation of a curved sensor 404 may occur in time (in one example direction), e.g., as the camera (and coupled lens 444) moves relative to an object 446. As can be seen, the object 446 from FIG. 4A to FIG. 4B has moved relative to the axis 448 of the lens 444. The sensor 404 has rotated to relative to the lens 444 to compensate for this camera/lens movement. Note that the figures herein are only for explanation, and none of the figures shown herein are intended to necessarily convey any scale and/or accurate relative positioning, accurate relative angles or the like (and indeed may be exaggerated to an extent).

Figure 5:
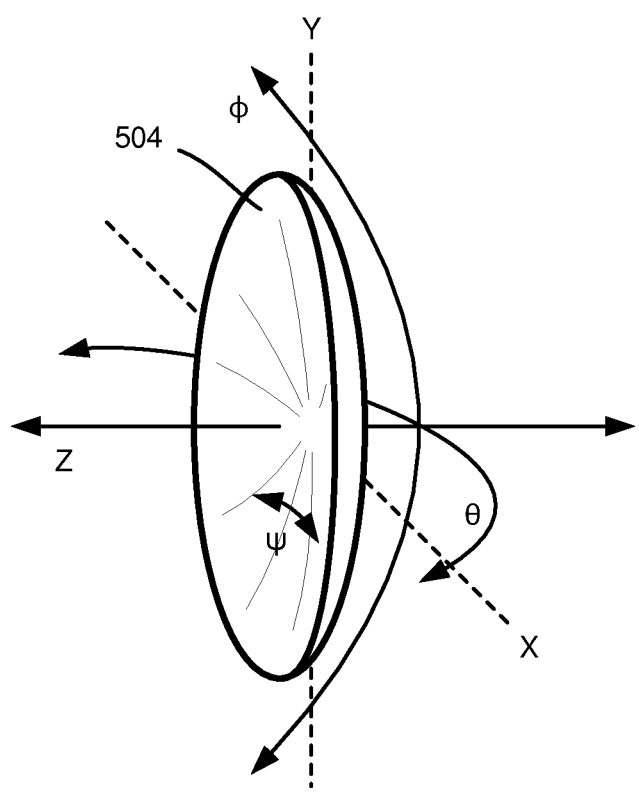
FIG. 5 is a three-dimensional representation of an example curved sensor demonstrating rotational capabilities, according to one or more example embodiments.

While FIGS. 3, 4A and 4B represent movement in one rotational direction, as is understood (and generally represented in FIG. 5), the movement of the curved sensor 504 may be in up to three directions. As also represented shown in FIG. 5, in some embodiments the sensor 504 may be translated in the Z-direction relative to the lens, e.g., to compensate for forward and backward camera movement, which is generally only useful for imaging very close objects. Other translational movement (X and Y) may be used if desired, such as to correct for lens inconsistencies as described above.

Figure 6A:
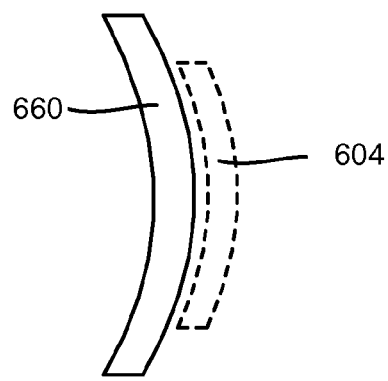
FIGS. 6A-6C are representations of how a curved sensor may be coupled to a carrier material into an assembly, with the assembly moved by electric motors, according to one example embodiment.

FIG. 6A is an example of one way in which rotation may be accomplished, via a curved carrier material 660 to which a sensor 604 is attached. Such a curved carrier material 660 is generally used to deform an otherwise planar sensor into the desired curved shape. The illustrated carrier material 660 in FIG. 6A is in front of the sensor 604, but may be behind the sensor as in FIG. 6B. The sensor may be gimbal mounted for rotation, for example, or may be moved in various other ways, including via electrical and/or magnetic force. If needed, the motion may be along a curved backing plate (or fronting plate) or the like, e.g., with very low friction properties. Note that the curved sensor and carrier assembly may be extremely light (e.g., on the order of a fraction of a gram) and thus may have a higher frequency response (e.g., in the 10 Hz to 100 Hz range) and thus faster movement relative to heavier optical elements, which is sufficient to correct for even severe camera vibrations.

Figure 6B:
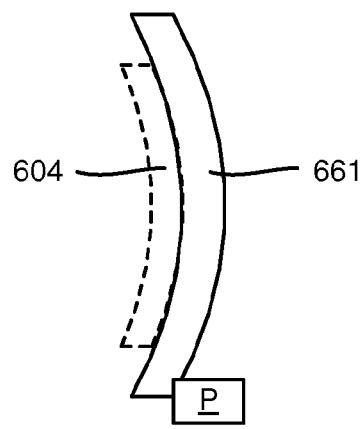

FIG. 6B shows carrier material 661 behind the curved sensor 604, driven to rotational movement by a small piezoelectric motor P. Note that piezoelectric technology is already used with planar sensors, for example.

Figure 6C:
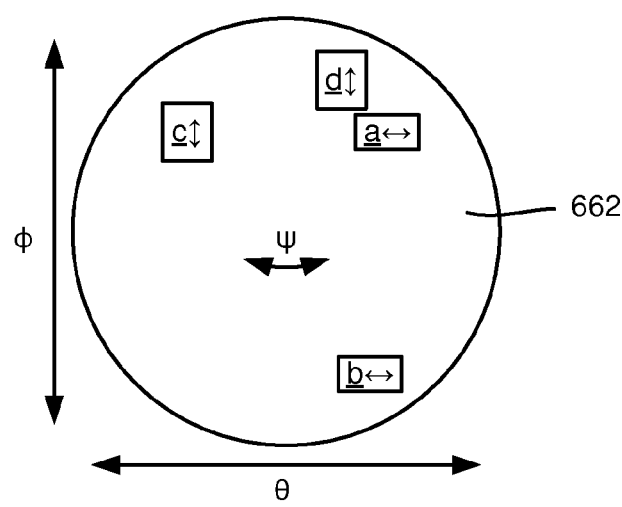

More than one such motor may be used, as shown in FIG. 6C. In FIG. 6C, four motors a, b, c, and d are positioned on the carrier 662, and energized appropriately to obtain the desired rotation. For example, motors a and d may be used with combined differential motion to move the carrier material 662 in the θ direction, the a and b pair in the ψ direction, and so on.

Figure 7A:
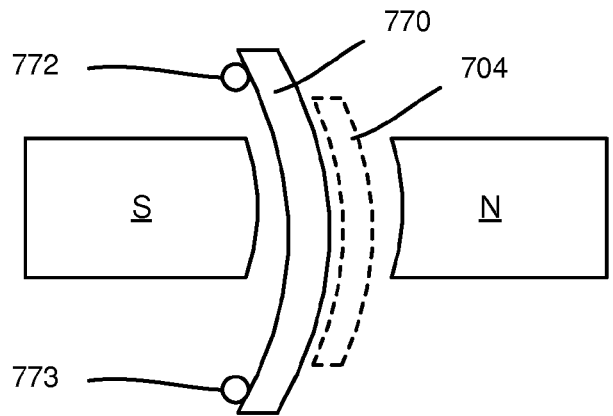
FIGS. 7A-7C are representations of how a curved sensor may be coupled to a carrier material into an assembly, with the assembly moved by electromagnetic force, according to one example embodiment.
Figure 7B:
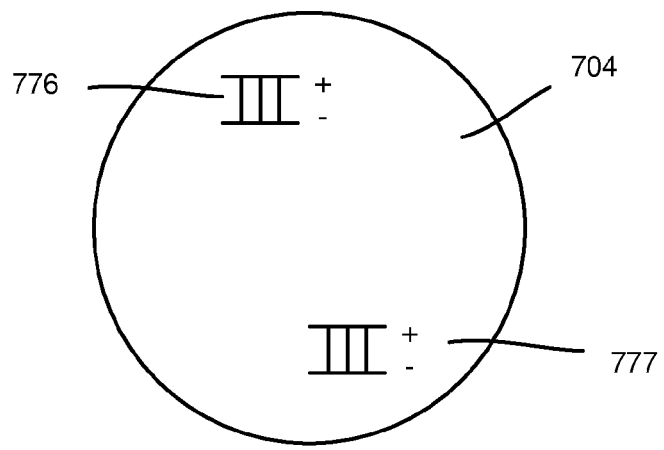
Figure 7C:
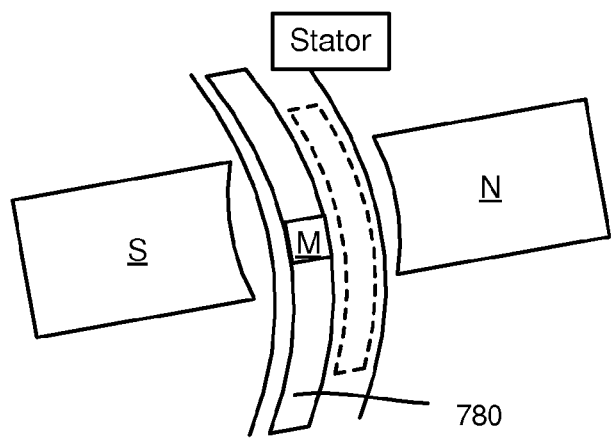

FIGS. 7A-7C show alternative movement mechanisms based on electromagnetism. In FIG. 7A, south magnet S and north magnet N create a magnetic field. The carrier material 770 moves along ball bearings (e.g., 772 and 773 are shown) or other low friction path, as driven by electrical, mechanical and/or magnetic force.

Electrical current may be through circuit traces (e.g., 776 and 777 are shown) as in FIG. 7B, including traces on the sensor 704 itself (as the sensor is already powered) or on the carrier material. By controlling the amount and direction of current flow through one or more of such traces, the magnetic field generated thereby moves the sensor/sensor assembly. Feedback may be used to balance the sensor/sensor assembly at a relatively precise position.

FIG. 7C shows another alternative, in which a permanent magnet M is embedded in a carrier 780. As can be readily appreciated, this embodiment operates by energizing electromagnet devices (e.g., coils) S an N, and although the weight of the permanent magnet is added to the moveable assembly, no additional current/traces are needed on the assembly.

Figure 8:
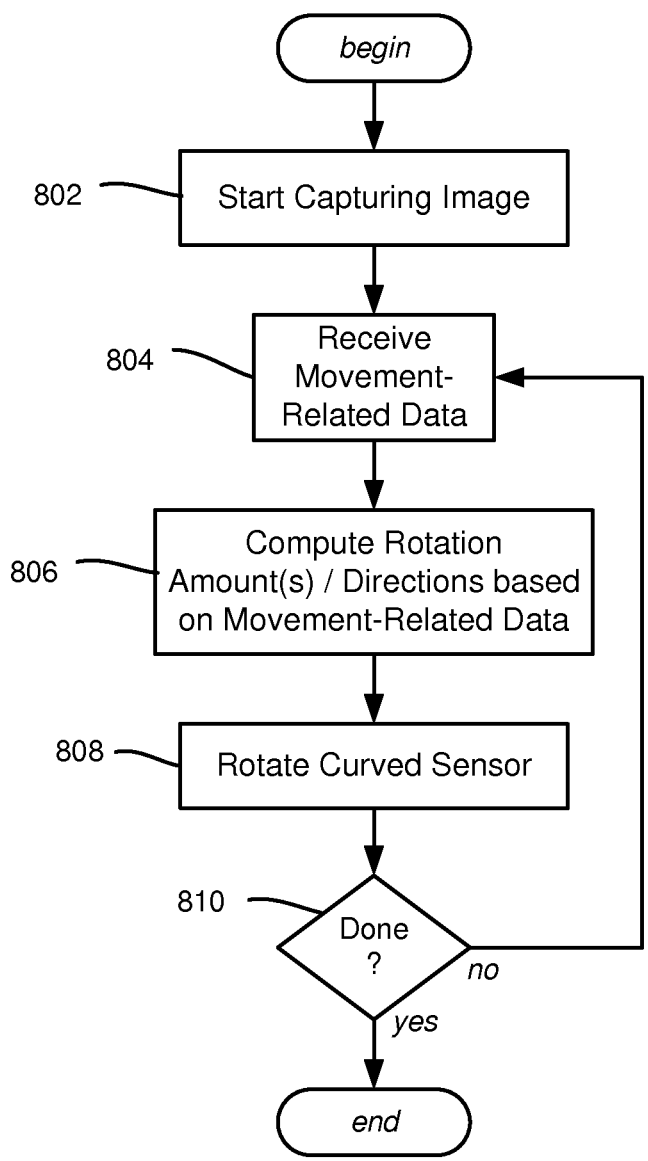
FIG. 8 is a flow diagram representing example steps that may be taken to rotate a curved sensor based upon movement-related data, according to one example embodiment.

FIG. 8 is a flow diagram showing example steps that may be taken to control rotation of the sensor, e.g., by an anti-shake correction controller, beginning at step 802 when the image capture is begun. In the example of FIG. 8, rotation is based upon movement-related data, such as the actual measured data (e.g., via gyroscopes), the feedback from image processing, or a combination of both. Step 804 represents receiving this movement data.

Step 806 computes the (one or more) rotation amounts and directions needed to counteract the movement. Typically this will be an amount of movement in all three rotational angles. Step 808 rotates the curved sensor the appropriate amount in each direction.

Step 810 represents evaluating whether capturing the image is done, e.g., based on the exposure time. If not, the process returns to step 804 to continue to make anti-shake adjustments. If so, the process ends until the next image capture starts, e.g., the next frame if video is being captured. Note that movement between frames also may be compensated for in a similar manner, e.g., considering the "start of capturing" at step 802 to be a trigger for anti-shake operations relative to a previous frame before starting the actual exposure.

Example Computing Device

As mentioned, advantageously, the techniques described herein can be applied to any device. It can be understood, therefore, that handheld, portable and other computing devices and computing objects of all kinds including standalone cameras are contemplated for use in connection with the various embodiments. Accordingly, the below general purpose remote computer described below in FIG. 9 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
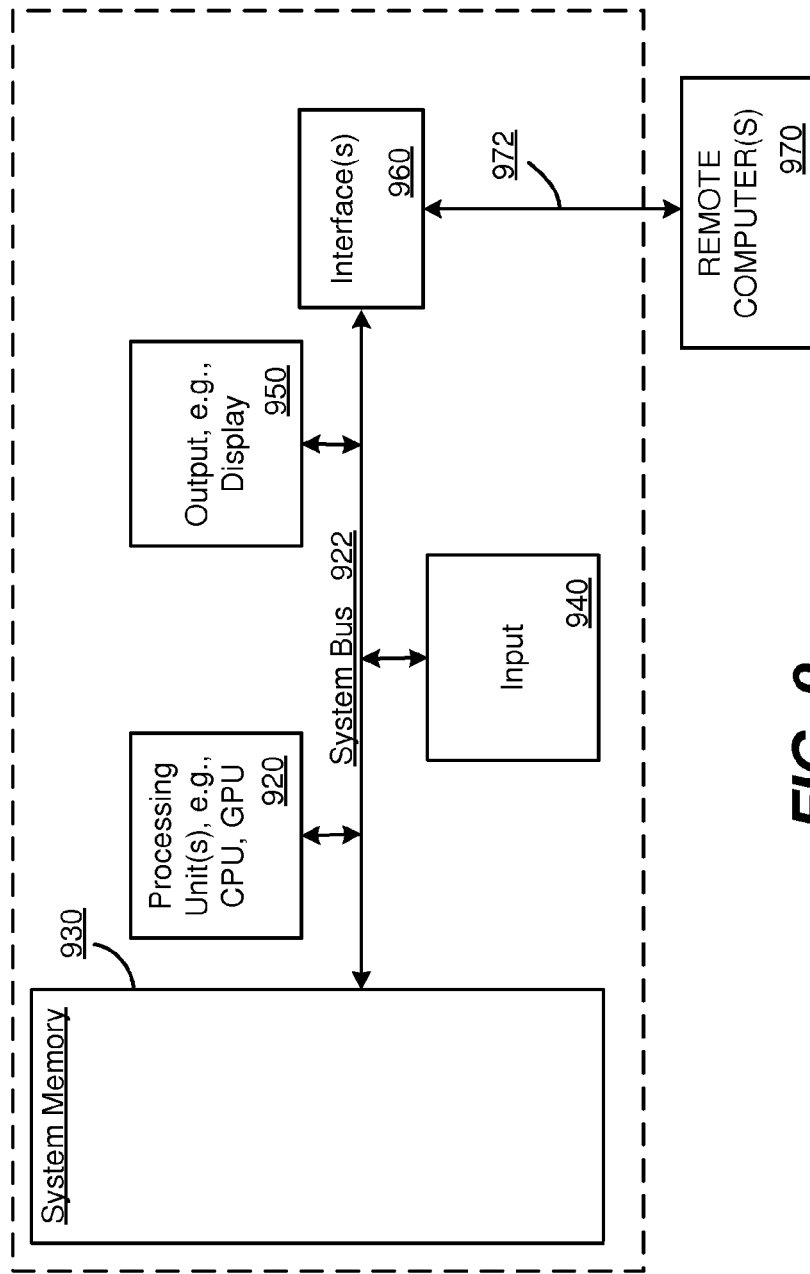
FIG. 9 is a block diagram representing an example environment into which aspects of the subject matter described herein may be incorporated.

FIG. 9 thus illustrates an example of a computing environment 900 in which one or aspects of the embodiments described herein (such as the anti-shake correction controller) can be implemented, although as made clear herein, the computing environment 900 is only one example of a suitable computing environment and is not intended to suggest any limitation as to scope of use or functionality. In addition, the computing environment 900 is not intended to be interpreted as having any dependency relating to any one or combination of components illustrated in the example computing environment 900.

With reference to FIG. 9, an example remote device for implementing one or more embodiments includes a processing unit 920, a system memory 930, and a system bus 922 that couples various system components including the system memory to the processing unit 920.

The environment may include a variety of logic, e.g., in an integrated circuit chip and/or computer-readable media which can be any available media that can be accessed. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information through input devices 940. A monitor or other type of display device also may be connected to the system bus 922 via an interface, such as output interface 950. In addition to a monitor, other peripheral output devices such as speakers may be connected through output interface 950.

The system may be coupled to one or more remote computers, such as remote computer 970. The remote computer 970 may be a personal computer, a server, a router, a network PC, a peer device or other common network node, or any other remote media consumption or transmission device, and may include any or all of the elements described above. The logical connections depicted in FIG. 9 include a bus such as a USB-based connection, or a wireless networking connection. Also, there are multiple ways to implement the same or similar functionality, e.g., an appropriate API, tool kit, driver code, operating system, control, standalone or downloadable software objects, etc., which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
a camera comprising:
a planar sensor; and
a curved carrier material coupled to the planar sensor, wherein the curved carrier material is configured to deform the planar sensor into a desired curved shape; and
a controller configured to:
detect an effect a movement of a camera has on a position of an object in an image captured by the camera; and
control movement of the deformed planar sensor in at least one rotational direction to at least partially correct for the detected effect of the movement of the camera.

2. The system of claim 1, wherein the curved carrier material receives driving signals from the controller and causes movement of the deformed planar sensor by movement of the curved carrier material.

3. The system of claim 1, wherein the curved carrier material is configured to be rotated about or substantially about a center of curvature of the curved carrier material in at least one direction in response to at least some of the camera movement.

4. The system of claim 1, wherein the curved carrier material is configured to be translated in one or more of the following: an X-direction, a Y-direction, and a Z-direction relative to a lens of the camera to compensate for forward and backward camera movement and to correct lens inconsistencies.

5. The system of claim 1, further comprising: a lens associated with the camera, wherein the lens of the camera is configured to provide an additional field of view relative to an image capturing region of the deformed planar sensor at any one positioning of the deformed planar sensor.

6. The system of claim 1 wherein the input data corresponding to the camera movement comprises a measure of camera movement data.

7. A method comprising:
receiving movement-related data associated with a forward and backward movement of a camera; and
translating a curved sensor in a Z-direction relative to a lens of the camera to at least partially compensate for the received movement data.

8. The method of claim 7 further comprising:
computing rotation amounts and rotation directions needed to counteract movement based upon additional movement related data; and
rotating the curved sensor based upon the rotation amounts and the rotation directions computed.

9. The method of claim 7 further comprising: processing image data to determine camera movement to provide feedback data, wherein receiving the movement-related data comprises receiving the feedback data.

10. The method of claim 7 further comprising:
determining whether an image capture is complete;
responsive to a determination that the image capture is not complete, receiving additional movement-related data; and
computing rotation amounts and rotation directions needed to counteract movement based upon the additional movement-related data.

11. The method of claim 7 further comprising:
computing rotation amounts and rotation directions needed to counteract movement based upon additional movement related data; and
controlling movement of the curved sensor based upon the rotation amounts and the rotation directions computed.

12. A camera comprising:
a curved sensor configured to be rotated relative to a lens, the lens having a field of view that is larger than an image capturing region of the curved sensor at any one positioning of the curved sensor; and
a controller configured to:
receive movement-related data corresponding to camera movement; and
cause translational movement of the curved sensor in response to the received movement-related data.

13. The camera of claim 12, wherein the controller is further configured to rotate the curved sensor in at least one rotational direction to compensate for the camera movement.

14. The camera of claim 12 further comprising: one or more electrically controlled motors, wherein the controller is configured to move the curved sensor in at least one rotational direction by outputting a driving signal to the one or more electrically controlled motors.

15. The camera of claim 12 wherein the controller is further configured to move the curved sensor in at least one rotational direction by outputting a driving signal that generates a magnetic field.

16. The camera of claim 12 further comprising: a carrier material coupled to the curved sensor, wherein the carrier material receives driving signals from the controller and causes movement of the curved sensor by movement of the carrier material.

17. The camera of claim 12 further comprising: a high frame rate image capturing component configured to provide evaluation images for image processing.

18. The camera of claim 12 wherein the lens is configured to provide an additional field of view relative to the image capturing region of the curved sensor at any one positioning of the curved sensor.

19. The camera of claim 12, wherein the curved sensor is further configured to be rotated about a center of a curvature of the curved sensor.

20. The camera of claim 12, wherein receiving movement-related data corresponding to camera movement comprises:
receiving an image captured by the camera, the image comprising an object;
detecting an effect a movement of the camera has on a position of the object in the image; and
causing the translational movement of the curved sensor in response to the detected effect of the movement of the camera.

* * * * *